US008881197B2

(12) United States Patent
Choi et al.

(10) Patent No.: US 8,881,197 B2
(45) Date of Patent: Nov. 4, 2014

(54) APPARATUS AND METHOD FOR PROCESSING AUGMENTED BROADCAST CONTENT USING ANALYSIS ALGORITHM BASED ON REFERENCE SIGNAL

(71) Applicant: Electronics and Telecommunications Research Institute, Daejeon-si (KR)

(72) Inventors: Bum-Suk Choi, Daejeon-si (KR); Jeoung-Lak Ha, Daejeon-si (KR); Soon-Choul Kim, Daejeon-si (KR); Jung-Hak Kim, Daejeon-si (KR); Young-Ho Jeong, Daejeon-si (KR); Jin-Woo Hong, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/870,109

(22) Filed: Apr. 25, 2013

(65) Prior Publication Data

US 2013/0290995 A1    Oct. 31, 2013

(30) Foreign Application Priority Data

Apr. 25, 2012   (KR) ........................ 10-2012-0043443
Apr. 22, 2013   (KR) ........................ 10-2013-0044448

(51) Int. Cl.
  *G06F 3/00*      (2006.01)
  *G06F 13/00*     (2006.01)
  *H04N 5/445*     (2011.01)
  *H04N 21/81*     (2011.01)

(52) U.S. Cl.
  CPC ................................ *H04N 21/8146* (2013.01)
  USPC .................... 725/40; 725/19; 725/42; 725/43; 725/51; 725/52; 725/53; 725/100; 725/131; 725/139

(58) Field of Classification Search
  USPC ............ 725/19, 40–43, 51–53, 100, 131, 139
  See application file for complete search history.

(56) References Cited

U.S. PATENT DOCUMENTS

2007/0192662 A1*   8/2007   Park et al. ...................... 714/748
2012/0240177 A1*   9/2012   Rose ............................. 725/116
2012/0291073 A1*   11/2012  Friedman ....................... 725/62

FOREIGN PATENT DOCUMENTS

| KR | 10-0870403     | B1 | 11/2008 |
| KR | 1020110057298  | B1 | 6/2011  |
| KR | 1020120004320  | A  | 1/2012  |
| KR | 10-1159420     | B1 | 6/2012  |

* cited by examiner

*Primary Examiner* — Mulugeta Mengesha
(74) *Attorney, Agent, or Firm* — Ladas & Parry LLP

(57) ABSTRACT

An apparatus and method for processing augmented broadcast content. The apparatus includes: a broadcast content receiving unit configured to receive broadcast content and a first reference signal from a broadcast content provider, the first reference signal including information used to recognize a target object in the broadcast content and composite the broadcast content and augmented content associated with the target object; an object identifying unit configured to identify the target object in the broadcast content by analyzing the broadcast content using an image or sound analysis algorithm with reference to the first reference signal; an augmented content acquiring unit configured to acquire the augmented content associated with the target object; and an augmented content compositing unit configured to composite the acquired augmented content into an augmentation region determined based on the first reference signal.

20 Claims, 5 Drawing Sheets

APPARATUS AND METHOD FOR PROCESSING AUGMENTED BROADCAST CONTENT USING ANALYSIS ALGORITHM BASED ON REFERENCE SIGNAL

CROSS-REFERENCE TO RELATED APPLICATION(S)

This application claims priority from and the benefit under 35 U.S.C. §119(a) of Korean Patent Applications No. 10-2012-0043443, filed on Apr. 25, 2012, and 10-2013-0044448, filed on Apr. 22, 2013, which are hereby incorporated by references for all purposes as if fully set forth herein.

BACKGROUND

1. Field

The following description relates to bidirectional augmented broadcasting service provision, and more particularly, to an apparatus and method for processing augmented broadcast content using an analysis algorithm based on a reference signal.

2. Description of the Related Art

Augmented broadcasting is a broadcasting service that provides viewers with programming, conveying a vivid sense of reality while smoothly blending augmented (or augmented reality) content into the broadcast content, and enables the viewers to have a choice in selecting broadcasting services, unlike traditional digital TV broadcasting services that are transmitted from broadcasting service providers in a unidirectional manner.

In conventional augmented broadcasting services, a broadcast transmitter needs to previously define an augmentation region in which augmented content appears in broadcast content, or a broadcast receiver displays augmented content on an augmented region that is specified based on orientation information received from a sensor.

However, in using such methods, in order to accurately display augmented content associated with a particular object on an augmentation region, the augmentation region should be manually updated.

Moreover, such methods increase the amount of transmission data for augmented broadcasting services.

SUMMARY

The following description relates to an apparatus and method for processing augmented broadcasting content using an analysis algorithm based on a reference signal, thereby enabling a broadcasting transmitter to automatically update an augmentation region.

In addition, there is provided an apparatus and method for processing augmented broadcasting content using an analysis algorithm based on a reference signal in such a manner to reduce the amount of transmission data.

In one general aspect, there is provided an apparatus for processing augmented broadcast content, the apparatus including: a broadcast content receiving unit configured to receive broadcast content and a first reference signal from a broadcast content provider, the first reference signal including information used to recognize a target object in the broadcast content and composite the broadcast content and augmented content associated with the target object; an object identifying unit configured to identify the target object in the broadcast content by analyzing the broadcast content using an image or sound analysis algorithm with reference to the first reference signal; an augmented content acquiring unit configured to acquire the augmented content associated with the target object; and an augmented content compositing unit configured to composite the acquired augmented content into an augmentation region determined based on the first reference signal.

The broadcast content receiving unit may be configured to further receive a second reference signal including information used to analyze video images of a user's movement to control augmented content, and the apparatus may further comprise a user image receiving unit configured to receive the video images of a user's movement and an augmented content controlling unit configured to control movement of the composited augmented content by analyzing the video images using an analysis algorithm with reference to the second reference signal.

The first reference signal may be information about a reference signal-related MPEG-4 binary format for scenes (BIFS) node.

The first reference signal may include information about at least one of a media source type and a location, ID and parameters of an analysis algorithm.

The first reference signal may include information about at least one of a particular image, a particular sound pattern and feature values, which is used to identify the target object.

The first reference signal may include information about a type and properties of augmented content associated with the target object, which is used to acquire the augmented content.

The second reference signal may be information about a reference signal-related MPEG-4 BIFS node.

The second reference signal may include information about at least one of a media source type and a location, ID and parameters of an analysis algorithm to be applied.

In another general aspect, there is provided a method of processing augmented broadcast content, the method including: receiving broadcast content and a first reference signal from a broadcast content provider, the first reference signal including information used to recognize a target object in the broadcast content and composite the broadcast content and augmented content associated with the target object; identifying the target object in the broadcast content by analyzing the broadcast content using an image or sound analysis algorithm with reference to the first reference signal; acquiring the augmented content associated with the target object; and compositing the acquired augmented content into an augmentation region which is determined based on the first reference signal.

The receiving of the broadcast content may include further receiving a second reference signal including information used to analyze video images of a user's movement to control augmented content and the method may further include receiving the video images of a user's movement; and controlling movement of the composited augmented content by analyzing the video images using an analysis algorithm with reference to the second reference signal.

The first reference signal may be information about a reference signal-related MPEG-4 BIFS node.

The first reference signal may include information about at least one of a media source type and a location, ID and parameters of an analysis algorithm.

The first reference signal may include information about at least one of a particular image, a particular sound pattern and feature values, which is used to identify the target object.

The first reference signal may include information about a type and properties of augmented content associated with the target object, which is used to acquire the augmented content.

The second reference signal may be information about a reference signal-related MPEG-4 BIFS node.

The second reference signal may include information about at least one of a media source type and a location, ID and parameters of an analysis algorithm to be applied.

Other features and aspects will be apparent from the following detailed description, the drawings, and the claims.

Figure 1:
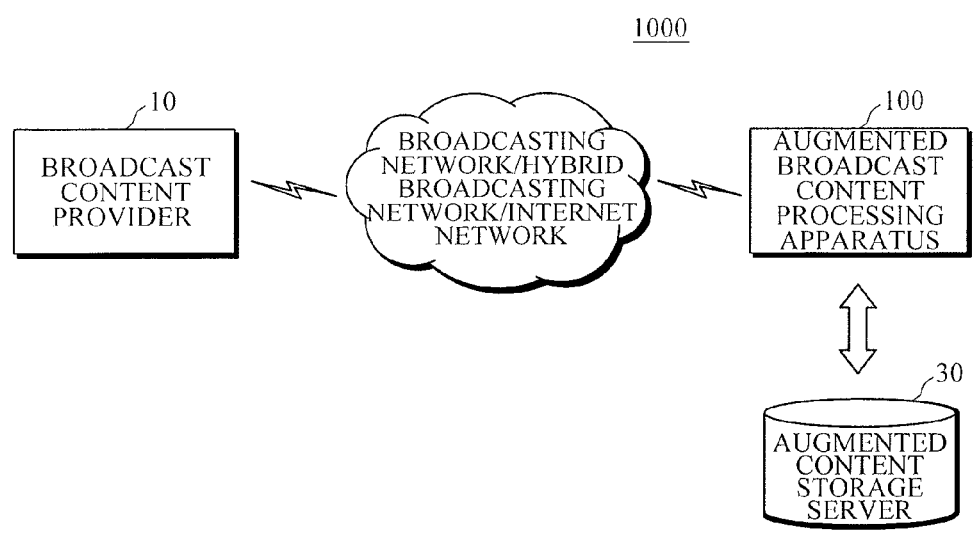
FIG. 1 is a diagram illustrating a configuration of a system for an augmented broadcasting service according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a configuration of a system for an augmented broadcasting service according to an exemplary embodiment of the present invention.

Referring to FIG. 1, a system 1000 for an augmented broadcasting service includes a broadcast content provider 10, an augmented content storage server 30, and an apparatus (hereinafter, will be referred to as an "augmented broadcast content processing apparatus") 100 for processing augmented broadcast content.

Although FIG. 1 illustrates the system 1000 including only one augmented content storage server 30 for convenience of illustration, the system 1000 may include a plurality of augmented content storage service 30 run by augmented reality (AR) content service providers.

The system 1000 may provide diversified, two-way augmented reality (AR) content associated with education, advertisements, games, maps, and social network services (SNS) through broadcast content that is to be transmitted over broadcasting networks or the Internet.

The broadcast content provider 10 analyzes the broadcast content to generate a reference signal, then, multiplexes the broadcast content and the reference signal, and transmits the multiplexed content and signal to the augmented broadcast content processing apparatus 100. For example, the broadcast content provider 10 may be a broadcast transmission system run by a broadcast service provider.

In one example, the broadcast content provider 10 may transmit the broadcast content and reference signal to the augmented broadcast content processing apparatus 100 over the broadcasting network or a hybrid broadcasting network. As another example, the broadcast content provider 10 may transmit the broadcast content to the augmented broadcast content processing apparatus 100 over either the broadcasting network or the hybrid broadcasting network and separately transmit the reference signal to the augmented broadcast content processing apparatus 100 over the Internet network.

Here, the reference signal may indicate target information allowing automatic tracking of a particular portion in an image or of a particular sound pattern. For convenience of description, the reference signal may be classified into a first reference signal and a second reference signal, wherein the first reference signal includes information used for identifying a target object in broadcast content and compositing the broadcast content and augmented content associated with the target content and the second reference signal includes information used for analyzing the user's movement to control the augmented content. The target object is a specific object contained in the broadcast content, being associated with augmented content. For example, the target object may be a specific region, a specific image, or a particular posture or position of a user.

Here, the first reference signal and the second reference signal may be information regarding a reference signal-related MPEG-4 binary format for scenes (BIFS) node. The reference signal-related MPEG-4 BIFS node will be described later in detail with reference to Table 1 and Table 2. The first reference signal and the second reference signal may include information about at least one of a media source type and a location, ID and parameters of an analysis algorithm to be applied.

In addition, the first reference signal may include information about at least one of a particular image, a particular sound pattern and feature values, which is used to identify a target object. Additionally, the first reference signal may further include augmented content search information used to acquire augmented content associated with a target object from the augmented content storage server 30. Furthermore, the first reference signal may also include information regarding a representation location of and method for augmented content.

The augmented content storage server 30 stores various augmented content corresponding to target objects. For example, the augmented content storage server 30 may be a content storage server run by an Internet portal service provider. In one example, the augmented content storage server 30 may be connected to the augmented broadcast content processing apparatus via the Internet network or a mobile communication network.

In addition, the augmented content storage server 30 may provide various types of augmented content to the augmented broadcast content processing apparatus 100. For example, the augmented content storage server 30 may provide the augmented broadcast content processing apparatus 100 with AR content related to tourism in association with broadcast content. As another example, the augmented content storage server 30 may provide the augmented broadcast content processing apparatus 100 with AR content related to map information in association with broadcast content.

The augmented broadcast content processing apparatus 100 may receive the broadcast content and the first reference signal from the broadcast content provider 10, identify a target object in the broadcast content by analyzing the broadcast content based on the first reference signal using an image or sound analysis algorithm, then acquire augmented content related to the identified target object, determine an augmentation region based on the first reference signal, and then composite the augmented content into the determined augmentation region. Here, "compositing" may be "overlaying".

In addition, the augmented broadcast content processing apparatus 100 may include a broadcast content receiving unit to receive the second reference signal, a user image receiving unit to receive a video of a user's movement, and an augmented content controlling unit to control the movement of the augmented content composited into broadcast content, wherein the composition of the augmented content is based on video image analysis with reference to the second reference signal.

The augmented broadcast content processing apparatus 100 may be a broadcast receiving terminal capable of playing back broadcast content. For example, the augmented broadcast content processing apparatus 100 may be an Internet protocol television (IPTV) or a smart TV. In another example, the augmented broadcast content processing apparatus 100 may be a set-top box to receive content from, for example, satellite broadcasting and cable broadcasting for IPTVs, origination trunk testing equipment (OTT), and smart TVs. In yet another example, the augmented broadcast content processing apparatus 100 may be a portable terminal capable of receiving television broadcasting and digital multimedia broadcasting (DMB). For example, the augmented broadcast content processing apparatus 100 may be a DMB phone, smartphone, or a smart pad.

Figure 2:
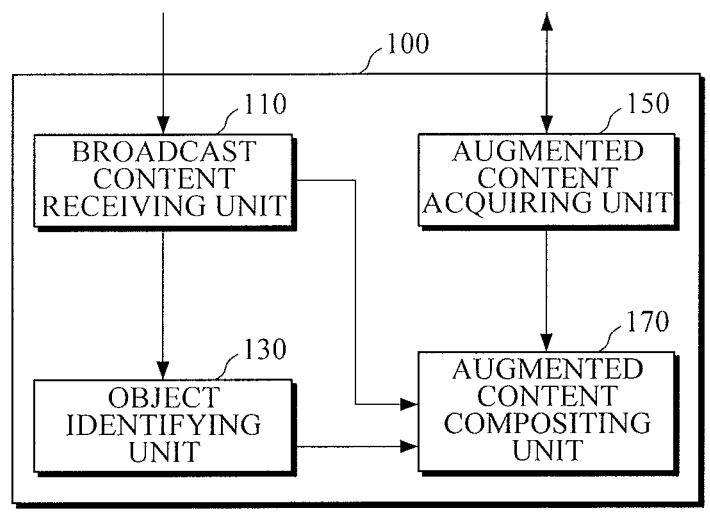
FIG. 2 is a diagram illustrating a configuration of an apparatus for processing augmented broadcast content according to an exemplary embodiment of the present invention.

FIG. 2 is a diagram illustrating a configuration of an apparatus for processing augmented broadcast content according to an exemplary embodiment of the present invention.

Referring to FIG. 2, an apparatus (hereinafter, will be referred to as an "augmented broadcast content processing apparatus") 100 for processing augmented broadcast content may include a broadcast content receiving unit 110, an object identifying unit 130, an augmented content acquiring unit 150, and an augmented content compositing unit 170.

The broadcast content receiving unit 110 may receive broadcast content and a first reference signal from a broadcast content provider 10 (refer to FIG. 1). Here, the first reference signal is used to identify a target object in the broadcast content and to composite augmented content associated with the target object into the broadcast content.

For example, the first reference signal may be information regarding a reference signal-related MPEG-4 BIFS node. The reference signal-related node will be described in detail with reference Table 1 and Table 2. In another example, the first reference signal may include information about at least one of a particular image, a particular sound pattern and feature values, which is used to identify the target object. In further example, the first reference signal may include at least one of a media source type and a location, ID and parameters of an analysis algorithm to be applied. The first reference signal may further include augmented content search information used to acquire augmented content associated with the target object from an augmented storage server.

Table 1 lists XSD descriptions of the reference signal-related MPEG-4 BIFS node, and Table 2 lists MPEG-4 BIFS textual description of the reference signal-related MPEG-4 BIFS node.

TABLE 1

<ProtoDeclare name="ReferenceSignalLocation"
locations="org:mpeg:referencesignallocation">

TABLE 1-continued

<field name="source" type="Strings" vrml97Hint="exposedField" stringArrayValue=""/>
<field name="referenceResources" type="Strings" vrml97Hint="exposedField" stringArrayValue=""/>
<field name="enabled" type="Boolean" vrml97Hint="exposedField" booleanValue="false"/>
<field name="detectionRegion" type="Vector2Array" vrml97Hint="exposedField" vector2ArrayValue=""/>
<field name="detectionHints" type="Strings" vrml97Hint="exposedField" stringArrayValue=""/>
<field name="translation" type="Vector3Array" vrml97Hint="exposedField" Vector3ArrayValue=""/>
<field name="rotation" type="Rotations" vrml97Hint="exposedField" rotationArrayValue=""/>
<field name="onInputDetected" type="Integer" vrml97Hint="eventOut"/>
<field name="onTranslationChanged" type="Integer" vrml97Hint="eventOut"/>
<field name="onRotationChanged" type="Integer" vrml97Hint="eventOut"/>
<field name="onError" type="Integer" vrml97Hint="eventOut"/>
</ProtoDeclare>

TABLE 2

```
EXTERNPROTO referenceSignalLocation[
    exposedField    MFString     source              []
    exposedField    MFString     referenceResources  []
    exposedField    SFBool       enabled             FALSE
    exposedField    MFVec2f      detectionRegion     []
    exposedField    MFString     detectionHints      []
    exposedField    MFVec3f      translation         []
    exposedField    MFRotation   rotation            []
    eventOut        MFInt32      onInputDetected
    eventOut        MFInt32      onTranslationChanged
    eventOut        MFInt32      onRotationChanged
    eventOut        SFInt32
                                 onError
] "org:mpeg:referenceSignalLocation"
```

Referring to Table 1 and Table 2, parameters of the reference signal-related node in accordance with MPEG-4 BIFS are defined as below.

The "referenceSignalLocation" prototype provides signal detection capabilities in a scene and computes the registration matrix of the signal (e.g. 3D geometric transformation for an image).

The exposed field "source" specifies the media resource or signal where the detection will be realized.

The exposed field "referenceResources" specifies the resource that needs to be detected by analyzing the "source" field. The resource can be a media of any type supported by the MP4RA (MPEG-4 Registration Authority) or an MPEG-V signal.

The exposed field "enabled" specifies whether the detection algorithm should be running or not.

The exposed field "detectionRegion" specifies a 2D region for searching Reference Signal by means of x, y array of points relative to the source coordinate system. This restricts searching area for the detection algorithm in order to reduce processing burden.

The exposed field "detectionHints" is used to describe some features of the resource that is to be detected. This is used by the detection algorithm in order to optimize the detection process. Examples of detection hints are keywords such as "textured image", "image with edges".

The exposed field "translation" specifies the 3D translation of the detected media/signal. The valid values are the ones that are enabled by the "onTranslationChanged" mask.

The exposed field rotation specifies the 3D rotation of the detected media/signal. The valid values are the ones that are enabled by the "onRotationChanged" mask.

The event out "onInputDetected" is set each time the detection algorithm is executed. It consists in a list specifying a detection mask for each media in the "referenceResources" field. Value "0" for the mask means that the resource was not detected. Value "1" means that the resource was detected.

The event out "onTranslationChanged" is set each time the registration algorithm is executed and a translation of the "referenceResources" is detected. These fields are an array specifying if the translation has changed for each media/signals from "referenceResources".

The event out "onRotationChanged" is set each time the registration algorithm is executed and a rotation of the "referenceResources" is detected. These fields are an array specifying if the rotation has changed for each media/signals from "referenceResources".

The event out "onError" is set when an error occurs in the detection algorithm. Currently the following error codes are defined:
 0—No error.
 1—Camera calibration matrix is not present for the current camera.
 2—Unspecified error.

The object identifying unit 130 may identify the target object in the broadcast content by analyzing the broadcast content using an image or sound analysis algorithm with reference to the first reference signal.

For example, the object identifying unit 130 may select an image analysis algorithm for tracking images contained in the broadcast content, based on information included in the first reference signal, the information regarding a location, ID and parameters of an analysis algorithm and a media source type. In addition, the object identifying unit 130 may track images in the broadcast content by applying the selected image analysis algorithm, and identify a target image that corresponds to a particular image contained in the first reference signal. In this case, the image analysis algorithm may be a well-known algorithm.

As another example, the object identifying unit 130 may select a sound analysis algorithm for tracking sound in the broadcast content, based on information contained in the first reference signal, the information regarding a location, ID and parameters of the analysis algorithm and a media source type. In addition, the object identifying unit 130 may track the sound in the broadcast content by applying the selected sound analysis algorithm and identify the target object that corresponds to a particular sound pattern contained in the first reference signal. In this case, the sound analysis algorithm may be a well-known algorithm.

In another example, the object identifying unit 130 may use an additional analysis tool (not shown) in an effort to track the broadcast content by applying the image or sound analysis algorithm to the broadcast content.

The augmented content acquiring unit 150 may acquire augmented content associated with the identified target object. For example, the augmented content acquiring unit 150 may acquire augmented content corresponding to the target object from the augmented content storage server 30, based on information about a type and properties of the augmented content contained in the first reference signal.

The augmented content compositing unit 170 may composite the augmented content associated with the target object into an augmentation region which is determined with reference to the first reference signal. That is, determination of the augmentation region is made based on the information contained in the first reference signal, and the augmented content associated with the target object is composited into the determined augmentation region. In this case, "compositing" may be "overlaying". In addition, during the composition process, content synchronization and/or 2D/3D rendering process may be executed so as to enable smoother composition of the augmented content and the broadcast content.

Figure 3:
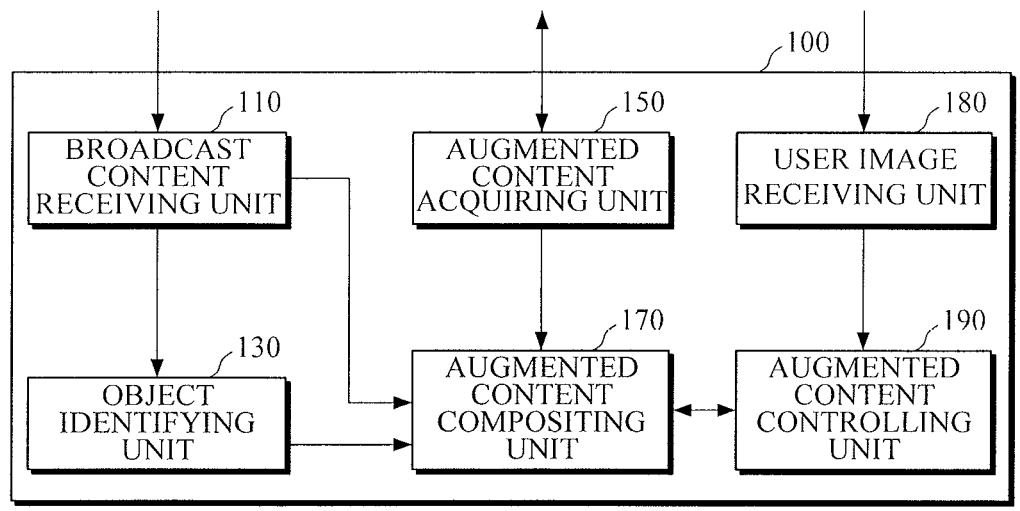
FIG. 3 is a diagram illustrating a configuration of an apparatus for processing augmented broadcast content according to another exemplary embodiment of the present invention.

FIG. 3 is a diagram illustrating a configuration of an apparatus for processing augmented broadcast content according to another exemplary embodiment of the present invention. Referring to FIG. 3, an apparatus (hereinafter, will be referred to as an "augmented broadcast content processing apparatus") 100 may include a broadcast content receiving unit 110, an object identifying unit 130, an augmented content acquiring unit 150, an augmented content compositing unit 170, a user image receiving unit 180, and an augmented content controlling unit 190.

The descriptions of the object identifying unit 130, the augmented content acquiring unit 150, and the augmented content compositing unit 170 are the same as described above, and thus only the broadcast content receiving unit 110, the user image receiving unit 180 and the augmented content controlling unit 190 will be described in detail hereinafter.

The broadcast content receiving unit 110 may receive a second reference signal as well as broadcast content and a first reference signal. The second reference signal contains information used to analyze images of a user's movement for controlling the augmented content.

Here, the second reference signal may be information about a reference signal-related MPEG-4 BIFS node. The reference signal-related MPEG-4 BIFS node is described above with reference to Table 1 and Table 2. In addition, the second reference signal may include information about at least one of a media source type and a location, ID and parameters of an analysis algorithm to be applied.

The user image receiving unit 180 may receive video images of a user's movement. For example, the user image receiving unit 180 may receive a video of marker images captured by a user's camera (not shown). The camera may be equipped in the augmented broadcast content processing apparatus 100, or be a separate device.

The augmented content controlling unit 190 may control movement of the composited augmented content by analyzing the video images using an analysis algorithm with reference to the second reference signal. For example, the user image receiving unit 180 may select an image analysis algorithm for tracking a user image based on information on the media source type and a location, ID and parameters of an analysis algorithm contained in the second reference signal. In addition, the augmented content controlling unit 190 recognizes the marker images in the video images using the selected image analysis algorithm, and tracks the movement of the marker image. Then, the augmented content controlling unit 190 controls the movement of the augmented content by utilizing the tracking result as a control signal. The image analysis algorithm may be a well-known algorithm.

Figure 4:
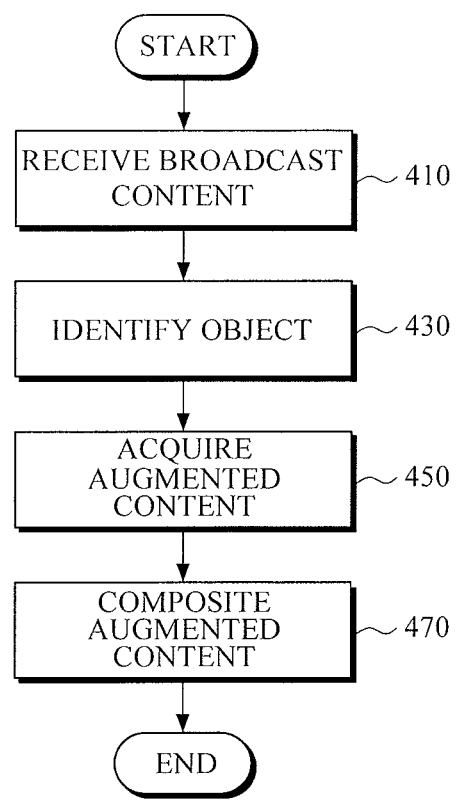
FIG. 4 is a flowchart illustrating a method of processing augmented content according to an exemplary embodiment of the present invention.

FIG. 4 is a flowchart illustrating a method of processing augmented content according to an exemplary embodiment of the present invention.

Referring to FIG. 4, a method of processing augmented content includes processes of: receiving broadcast content (410), identifying an object (430), acquiring augmented content (450), and compositing augmented content (470).

In 410, broadcast content and a first reference signal are received from a broadcast content provider 10 (see FIG. 1). The first reference signal includes information required for identifying a target object in the broadcast content and compositing augmented content associated with the target object into the broadcast content.

For example, the first reference signal may be information regarding a reference signal-related MPEG-4 BIFS node. The reference signal-related MPEG-4 BIFS node is described above with reference to Table 1 and Table 2. In another example, the first reference signal may include information about at least one of a particular image, a particular sound pattern and feature values, which is used to identify a target object. In yet another example, the first reference signal may include information about at least one of media source type and a location, ID and parameters of an analysis algorithm to be applied. In yet another example, the first reference signal may include augmented content search information used to acquire augmented content associated with the target object from the augmented content storage server 30 (see FIG. 1).

Then, in 430, a target object is identified from the broadcast content through the analysis of the broadcast content using an image or sound analysis algorithm based on the first reference signal.

For example, in 430, an image analysis algorithm may be selected for tracking an image in the broadcast content, based on information contained in the first reference signal, the information regarding a media source type and a location, ID and parameters of an analysis algorithm. Then, the broadcast content may be tracked by applying the selected image analysis algorithm to the broadcast content, and the target object corresponding to the particular image contained in the first reference signal may be identified. The image analysis algorithm may be a well-known algorithm.

In another example, in 430, a sound analysis algorithm may be selected for tracking sound in the broadcast content, based on information contained in the first reference signal, the information regarding a media source type and a location, ID and parameters of an analysis algorithm. In addition, the broadcast content may be tracked by applying the selected sound analysis algorithm to the broadcast content, and the target object corresponding to the particular sound pattern contained in the first reference signal may be identified. The sound analysis algorithm may be a well-known algorithm.

In another example, in 430, to track the broadcast content by applying the image or sound analysis algorithm to the broadcast content, an additional analysis tool (not shown) may be used.

Thereafter, in 450, augmented content associated with the identified target object is acquired. For example, in 450, based on information contained in the first reference signal, regarding a type and properties of the augmented content, the augmented content associated with the target object is acquired from the augmented content storage server 30.

In 470, the augmented content associated with the target object is composited into an augmentation region of the broadcast content, which is determined based on the first reference signal. That is, based on the augmented content search information contained in the first reference signal, the augmentation region in the broadcast content is determined, and the augmented content associated with the target object is composited into the augmentation region. Here, the augmented content search information may include a type and properties of the augmented content associated with the target object. In this case, "compositing" may be "overlaying". Further, in 470, content synchronization and/or 2D/3D rendering may be executed for smooth composition of the augmented content and the broadcast content.

Figure 5:
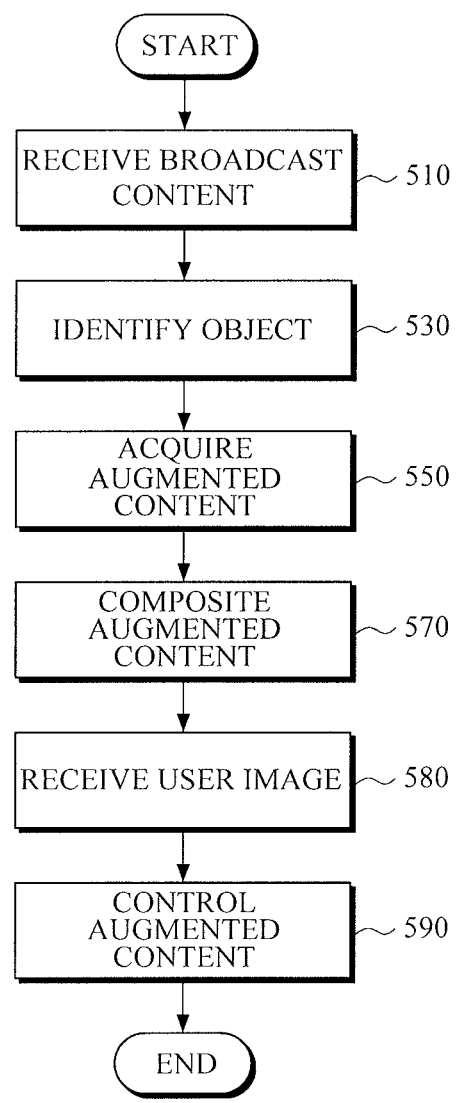
FIG. 5 is a flowchart illustrating a method of processing augmented content according to another exemplary embodiment of the present invention.

FIG. 5 is a flowchart illustrating a method of processing augmented content according to another exemplary embodiment of the present invention.

Referring to FIG. 5, a method of processing augmented content includes processes of: receiving broadcast content (510), identifying an object (530), acquiring augmented content (550), compositing augmented content (570), receiving user image (580), and controlling augmented content (590).

Since operations 530, 550, and 570 are the same as operations 430, 450, and 470 shown in FIG. 4, only processes of receiving broadcast content (510), receiving user image (580) and controlling augmented content (590) will be described in detail hereinafter.

In 510, a second reference signal is received along with broadcast content and a first reference signal, wherein the second reference signal includes information used to analyze images of a user's movement to control augmented content.

The second reference signal may be information regarding a MPEG-4 BIFS node. The MPEG-4 BIFS node is described above with reference to Table 1. Moreover, the second reference signal may include information about at least one of a media source type and a location, ID and parameters of an analysis algorithm to be applied.

In 580, video images of a user's movement are received. For example, the user image receiving unit 180 (see FIG. 3) may receive a user video of marker images captured by a user's camera. In this case, the camera may be equipped in the augmented broadcast content processing apparatus 100, or be a separate device.

Then, in 590, the movement of augmented content composited into the received video is controlled by analyzing the user video using an analysis algorithm with reference to the second reference signal. For example, in 590, based on information contained in the second reference signal, regarding a media source type and a location, ID and parameters of an analysis algorithm, an image analysis algorithm may be selected for tracking the user image. Then, a marker image in the video images is recognized through the analysis using the selected image analysis algorithm, and the movement of the marker image is tracked. Then, the movement of the augmented content composited in the video image is controlled by utilizing a tracking result as a control signal. The image analysis algorithm may be a well-known algorithm.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing augmented broadcast content, the apparatus comprising:
 a broadcast content receiving unit configured to receive broadcast content and a first reference signal from a broadcast content provider, the first reference signal including information used to recognize a target object in the broadcast content and composite the broadcast content and augmented content associated with the target object;
 an object identifying unit configured to identify the target object in the broadcast content by analyzing the broadcast content using an image or sound analysis algorithm with reference to the first reference signal;

an augmented content acquiring unit configured to acquire the augmented content associated with the target object; and an augmented content compositing unit configured to composite the acquired augmented content into an augmentation region which is determined based on the first reference signal.

2. The apparatus of claim 1, wherein the broadcast content receiving unit is configured to further receive a second reference signal including information used to analyze video images of a users movement to control augmented content, and the apparatus further comprises a user image receiving unit configured to receive the video images of a user's movement; and an augmented content cont oiling unit configured to control movement of the composited augmented content by analyzing the video images using an analysis algorithm with reference to the second reference signal.

3. The apparatus of claim 1, wherein the first reference signal is information about a reference signal-related MPEG-4 binary format for scenes (BIFS) node.

4. The apparatus of claim 1, wherein the first reference signal includes information about at least one of a media source type and a location, ID and parameters of an analysis algorithm.

5. The apparatus of claim 1, wherein the first reference signal includes information about at least one of a particular image, a particular sound pattern and feature values, which is used to identify the target object.

6. The apparatus of claim 1, wherein the first reference signal includes information about a type and properties of augmented content associated with the target object, which is used to acquire the augmented content.

7. The apparatus of claim 2, wherein the second reference signal is information about a reference signal-related MPEG-4 BIFS node.

8. The apparatus of claim 2, wherein the second reference signal includes information about at least one of a media source type and a location, ID and parameters of an analysis algorithm to be applied.

9. A method of processing augmented broadcast content, the method comprising: receiving broadcast content and a first reference signal from a broadcast content provider, the first reference signal including information used to recognize a target object in the broadcast content and composite the broadcast content and augmented content associated with the target object;

identifying the target object in the broadcast content by analyzing the broadcast content using an image or sound analysis algorithm with reference to the first reference signal;

acquiring the augmented content associated with the target object; and compositing the acquired augmented content into an augmentation region which is determined based on the first reference signal.

10. The method of claim 9, wherein the receiving of the broadcast content comprises further receiving a second reference signal including information used to analyze video images of a user's movement to control augmented content and the method further comprises receiving the video images of a user's movement; and controlling movement of the composited augmented content by analyzing the video images using an analysis algorithm with reference to the second reference signal.

11. The method of claim 9, wherein the first reference signal is information about a reference signal-related MPEG-4 BIFS node.

12. The method of claim 9, wherein the first reference signal includes information about at least one of a media source type and a location, ID and parameters of an analysis algorithm.

13. The method of claim 9, wherein the first reference signal includes information about at least one of a particular image, a particular sound pattern and feature values, which is used to identify the target object.

14. The method of claim 9, wherein the first reference signal includes information about a type and properties of augmented content associated with the target object, which is used to acquire the augmented content.

15. The method of claim 10, wherein the second reference signal is information bout a reference signal-related MPEG-4 BIFS node.

16. The method of claim 10, wherein the second reference signal includes information about at least one of a media source type and a location, ID and parameters of an analysis algorithm to be applied.

17. The apparatus of claim 1, wherein the broadcast content and the first reference signal are received separately from different networks.

18. The method of claim 9, wherein the broadcast content and the first reference signal are received separately from different networks.

19. The method of claim 9, wherein the first reference signal includes augmented content search information used to acquire augmented content associated with the target object from an augmented content storage server.

20. A method of processing augmented broadcast content, the method comprising: receiving broadcast content and a first reference signal from a broadcast content provider, the first reference signal including information used to recognize a target object in the broadcast content and composite the broadcast content and augmented content associated with the target object;

identifying the target object in the broadcast content by analyzing the broadcast content using an image or sound analysis algorithm with reference to the first reference signal, wherein identifying the target object in the broadcast content comprises:

selecting an image analysis algorithm based on the information included in the first reference signal, applying the selected image analysis algorithm to the broadcast content, and identifying the target object corresponding to a particular image which is contained in the information included in the first reference signal;

acquiring the augmented content associated with the target object; and compositing the acquired augmented content into an augmentation region which is determined based on the first reference signal.

* * * * *